(12) United States Patent
Deonarine et al.

(10) Patent No.: US 10,467,320 B2
(45) Date of Patent: Nov. 5, 2019

(54) METHOD FOR PROVIDING SEAMLESS GRAPHICAL USER INTERFACE CONTROL FOR A COMPLEX SYSTEM CONSISTING OF DISTRIBUTED HARDWARE MODULES

(71) Applicant: Polycom, Inc., San Jose, CA (US)

(72) Inventors: Jonathan L. Deonarine, Pflugerville, TX (US); David W. Bourgoyne, The Hills, TX (US)

(73) Assignee: Polycom, Inc., San Jose, CA (US)

( * ) Notice: Subject to any disclaimer, the term of this patent is extended or adjusted under 35 U.S.C. 154(b) by 876 days.

(21) Appl. No.: 14/817,667

(22) Filed: Aug. 4, 2015

(65) Prior Publication Data

US 2016/0043907 A1 Feb. 11, 2016

Related U.S. Application Data

(60) Provisional application No. 62/033,522, filed on Aug. 5, 2014.

(51) Int. Cl.
*G06F 9/451* (2018.01)
*G06F 16/958* (2019.01)
*G06F 16/00* (2019.01)

(52) U.S. Cl.
CPC ............ *G06F 16/986* (2019.01); *G06F 9/451* (2018.02); *G06F 16/00* (2019.01)

(58) Field of Classification Search
CPC combination set(s) only.
See application file for complete search history.

(56) References Cited

U.S. PATENT DOCUMENTS

| 6,020,881 A * | 2/2000 | Naughton | H04L 12/282 |
| | | | 348/E5.102 |
| 7,293,236 B2 * | 11/2007 | Choi | G06F 16/95 |
| | | | 715/734 |
| 8,479,101 B2 * | 7/2013 | Dees | H04L 12/2803 |
| | | | 715/740 |
| 9,756,201 B2 * | 9/2017 | Kano | H04N 1/00464 |
| 2002/0154161 A1 * | 10/2002 | Friedman | G08C 17/00 |
| | | | 715/740 |
| 2008/0222213 A1 * | 9/2008 | Arai | G06F 17/2217 |
| 2008/0301277 A1 * | 12/2008 | Tsujiguchi | G03G 15/5075 |
| | | | 709/223 |
| 2013/0286425 A1 * | 10/2013 | Nakamura | G06F 3/1204 |
| | | | 358/1.13 |
| 2014/0325470 A1 * | 10/2014 | Padmavilasom | H04L 67/2823 |
| | | | 717/100 |
| 2016/0065762 A1 * | 3/2016 | Kano | H04N 1/00464 |
| | | | 358/1.15 |
| 2016/0330266 A1 * | 11/2016 | Bakhmutov | H04L 67/025 |

* cited by examiner

*Primary Examiner* — Hien L Duong
(74) *Attorney, Agent, or Firm* — Blank Rome, LLP

(57) ABSTRACT

A controller has a basic GUI formed of HTML5 and Javascript including elements to control a system as a whole. The controller receives GUI HTML5 and Javascript from each connected hardware module, such as a camera, microphone, lighting controller and the like. The controller adds the received HTML5 and Javascript from each hardware module to the base code and sends the combined GUI to the user. Data is returned from the user to the controller and then forwarded to the proper hardware module.

18 Claims, 5 Drawing Sheets

METHOD FOR PROVIDING SEAMLESS GRAPHICAL USER INTERFACE CONTROL FOR A COMPLEX SYSTEM CONSISTING OF DISTRIBUTED HARDWARE MODULES

CROSS REFERENCE TO RELATED APPLICATIONS

This is application claims the benefit under 35 U.S.C. § 119(e) of U.S. Provisional Patent Application Ser. No. 62/033,522 entitled "Method for Providing Seamless Graphical User Interface Control for a Complex System Consisting of Distributed Hardware Modules," filed Aug. 5, 2014, which is hereby incorporated by reference.

BACKGROUND OF THE INVENTION

1. Field of the Invention

The invention relates to graphical user interfaces.

2. Description of the Related Art

Complex systems are being built by loosely coupling distributed hardware modules interconnected over various connections. Application Programming Interfaces (APIs) which allow a controller to discover and control these distributed hardware modules are necessary. These API's are usually well understood and change slowly for given system functionality.

However, these hardware modules often require user interaction through some graphical user interface (GUI). Each hardware module may require unique control, since its function in the system may be vastly different than other hardware modules so that GUI control is particular to each hardware module and their variants. The GUI API's for these hardware modules tend to change rapidly, as new hardware module variants often have different capabilities and configurations. This results in either the new hardware modules foregoing some capabilities or the controller API changing frequently, with the resultant need to frequently update the controller.

Consider a hardware component that requires the user to navigate a USB flash drive and select files. API's will be needed to support: directory tree traversal, file type sorting, file selection, file moving, file deletion, etc. The controller would build the GUI interface and have to translate user events into remote procedure calls (RPC). It would then have to translate the RPC results to GUI control.

Alternatively the hardware modules may provide the same service, such as an encoded camera video, but may have very different GUI needs. For example, they may have advanced camera algorithms which can be enabled or disabled. They may have more selection in terms of white balance and exposure. Now the controller's software must be revised to accommodate each new hardware module variant.

The user simply wants to control the system and does not want to understand the underlying complexities due to the system's distributed architecture. The user will use his web-enabled device (tablet, phone, etc.) to connect to a central controller. The controller must present a seamless GUI control of the distributed system. The distributed modularity of the system must be hidden from the user.

SUMMARY OF THE INVENTION

A controller has a basic GUI formed of HTML5 and Javascript including elements to control a system as a whole. The controller receives GUI HTML5 and Javascript from each connected hardware module, such as a camera, microphone, lighting controller and the like. The controller adds the received HTML5 and Javascript from each hardware module to the base code and sends the combined GUI to the user. Data is returned from the user to the controller and then forwarded to the proper hardware module.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Embodiments according to the present invention provide a way to aggregate the GUI controls from all the distributed hardware modules and present them to a user as a single seamless GUI. The user has no indication of the modularity of the system.

The overall GUI preferably uses HTML5 and JavaScript as its foundation. The controller carries a base payload of general settings for controlling the system as a whole.

When a hardware module is connected to the controller, the hardware module supplies a chunk of HTML that exposes user control for the new hardware module. It is understood that references in this description use HTML as a shorthand for the preferred HTML5 and Javascript for brevity but also for other equivalent programming languages. The controller adds this HTML and JavaScript to the base payload and serves the combined GUI to the user.

When the user wishes to make a settings change to a hardware module, the controller receives this REST request containing JSON-encoded data and proxies the connection to the affected hardware module, then returns the module's response. This way, the network between the hardware module and the controller can be kept separate from the network between the user and the controller.

Figure 1:
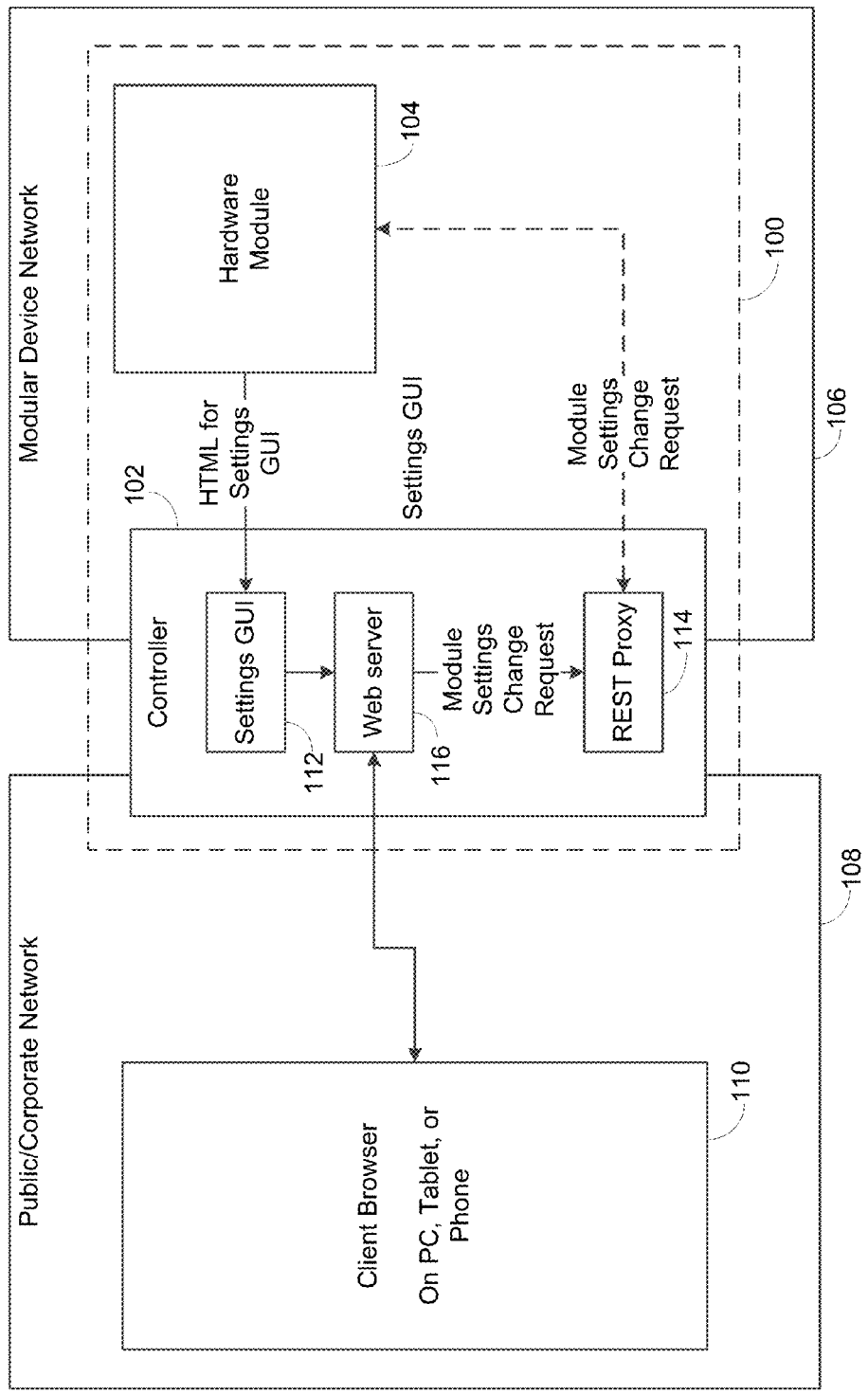
FIG. 1 is a block diagram of a controller and hardware module according to the present invention.

Referring to FIG. 1, a modular device 100 is shown. In the illustrated embodiment, the modular device 100 includes a hub device or controller 102 and a single hardware module 104. The controller 102 and the hardware module 104 are connected by a modular device network 106 to provide HTML for the setting GUI and to receive module settings change requests from the controller 102. The controller 102 is also connected to a public or corporate network 108. Typically this network would be a local area network (LAN) but could include other networks such as the Internet. A client browser 110 executes on a computer, tablet, phone or similar device (not shown). The client browser 110 is connected to the controller 102.

The controller 102 includes two illustrated modules, a settings GUI module 112 and a REST proxy module 114. Both are connected to a web server 116, which allows the controller 102 to present a web GUI to the client browser 110. When the client browser 110 requests a control web page of the controller 102, the web server 116 communicates with the setting GUI module 112 to provide a web page as described below. The provided web page includes portions for the controller 102 and for the hardware module 104. When the user requests a change to a setting on the provided web page, a module settings change request is provided from the client browser 110 to the web server 116, which provides the request to the REST proxy module 114. The REST proxy module 114 provides the changes to the hardware module 104 through a REST interface.

Thus the client browser 110 can receive a web page that includes portions from both the controller 102 and the hardware module 104 and can make changes to either device.

Figure 2:
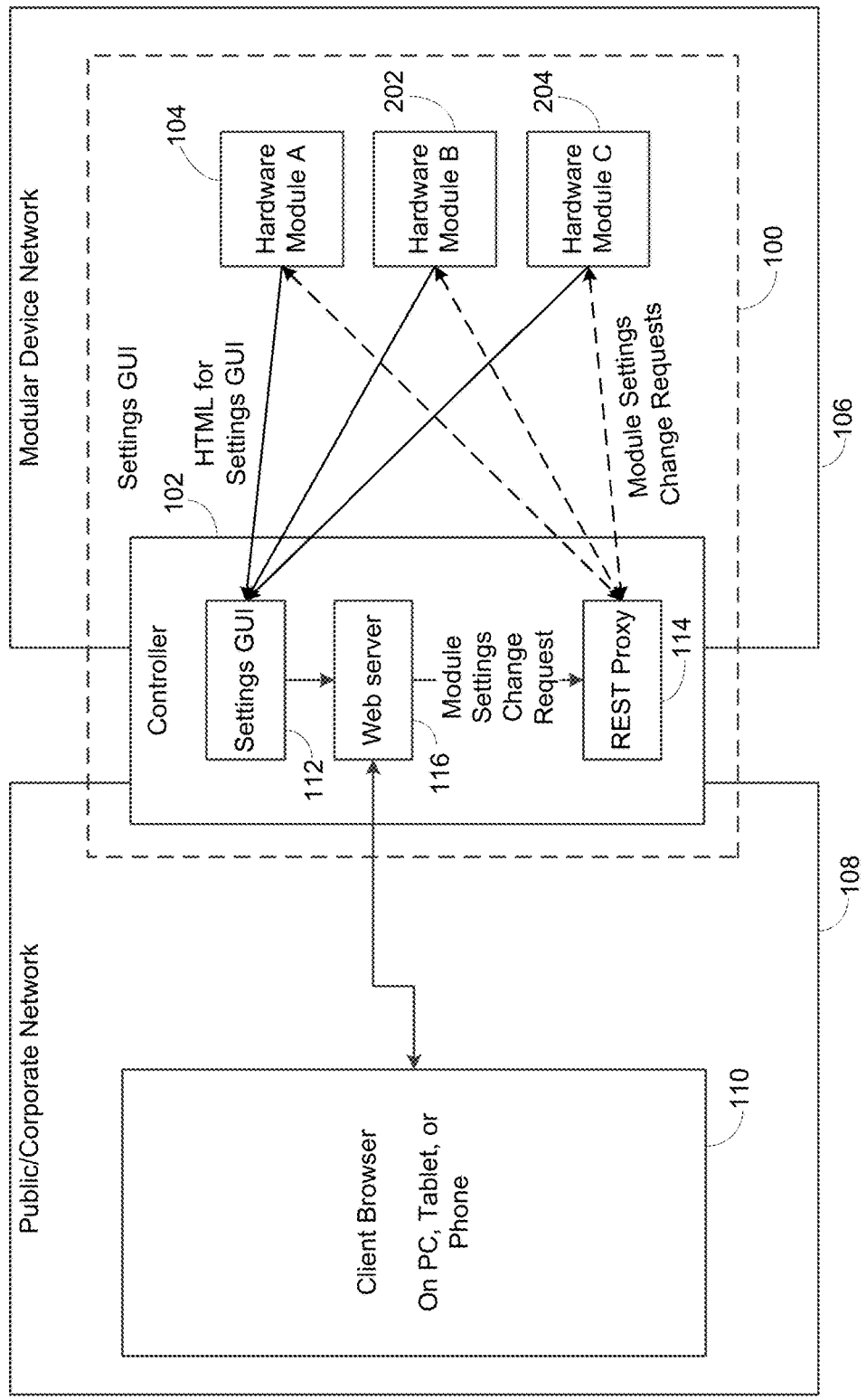
FIG. 2 is a block diagram of a controller and multiple hardware modules according to the present invention.

FIG. 2 is similar to FIG. 1 and like elements have been numbered the same. Two additional hardware modules 202 and 204 are present in FIG. 2. Both hardware modules 202 and 204 are connected to the controller 102 to provide their HTML of the setting GUI and to receive module settings change requests.

Figure 3:
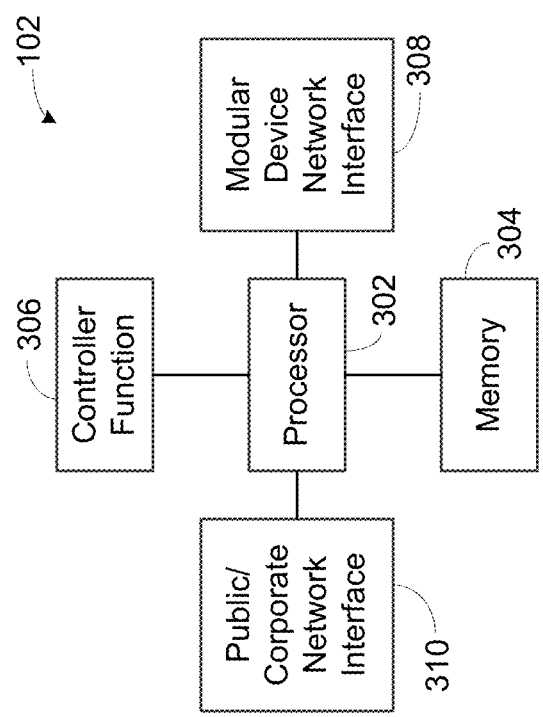
FIG. 3 is a block diagram of the controller of FIGS. 1 and 2.

FIG. 3 is a simple block diagram of the controller 102. A processor 302 is connected to a memory 304, which contains both working memory and program storage memory. The program storage memory contains software to cause the controller 102 to execute as described herein as well as to perform its normal functions. A controller function module 306 is connected to the processor 302. The controller function module 306 is exemplary of the various functions of the distributed system that reside in the controller 102 itself. These may include a network interface to allow the distributed system to interact with other systems. For example, if the distributed system is a videoconferencing system, the network interface allows communication with other videoconferencing devices. The controller function module 102 may include other functions, such as an audio decoder and speaker driver to drive a subwoofer for a videoconferencing system. The included functions in the controller function module 302 depend on the particular distributed system's function and the particular functions that reside in other hardware modules. The controller function module 302 is used as a representation for the various functions and related hardware that may be present.

The processor 302 is also connected to a modular device network interface 308. This is the interface, such as a wireless interface, to allow the controller 102 to communicate with the various hardware modules in the distributed system. A public/corporate network interface 310, which may be wired or wireless, is connected to the processor 302 to allow communication over the public/corporate network 108, for example to allow the client browser 110 access to the controller 102.

Figure 4:
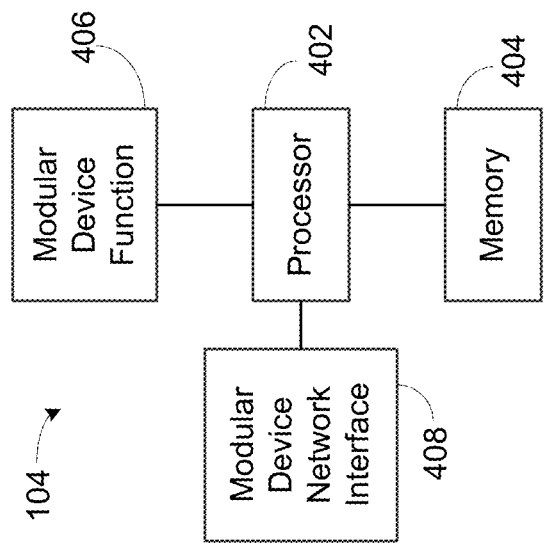
FIG. 4 is a block diagram of an exemplary hardware module of FIGS. 1 and 2.

FIG. 4 is a block diagram of a hardware module, such as hardware module 104. The hardware module 104 includes a processor 402 connected to a memory 404, which contains both working memory and program storage memory. The program storage memory contains software to cause the hardware module 104 to execute the necessary software to perform its normal functions. A modular device function 406 is connected to the processor 402. As with the controller function 306, the modular device function 406 is the necessary hardware for the hardware module 104 to perform its intended function. For example, the hardware function may be a video decoder for use in a distributed video conferencing system. Or the function could be a video camera or microphone for use in the distributed video conferencing system. Or the function could be a lighting controller to control the lighting levels in the room containing the video conference components. Therefore it is clear that the function can widely vary based on the particular function for the system as a whole. As above with the controller 102, the particular function depends on the function of the distributed system and the distribution of the functions in the various hardware modules. The hardware module 104 and the illustrated modular device function 306 are representative. A modular device network interface 308 is connected to the processor 302 to allow the hardware module 104 to communicate with the controller 102 and any other hardware modules as needed.

Figure 5A:
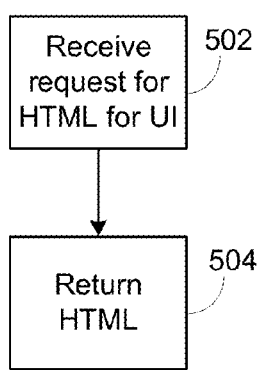
FIGS. 5A and 5B are flowcharts of operation of the hardware module of FIG. 4 relating to the GUI.
Figure 5B:
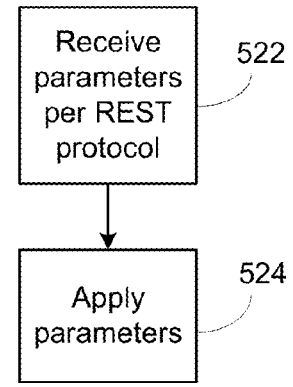

FIGS. 5A and 5B are flowcharts of relevant software operations of the hardware module 104. These are just the relevant software operations for this description and it is understood that numerous other software operations will be occurring on the hardware module 104, both underlying operating system operations and hardware module 104 function operations. Those have been omitted here for clarity. In step 502 the hardware module 104 receives a request for the HTML of its portion of the GUI from the controller 102. In step 504 the hardware module 104 returns the HTML for the GUI to the controller 102.

In step 522 the hardware module 104 receives parameters or settings values from the controller 102. These are preferably provided in a REST protocol. These settings control the operation of the hardware module 102 and are applied in step 524.

Figure 6A:
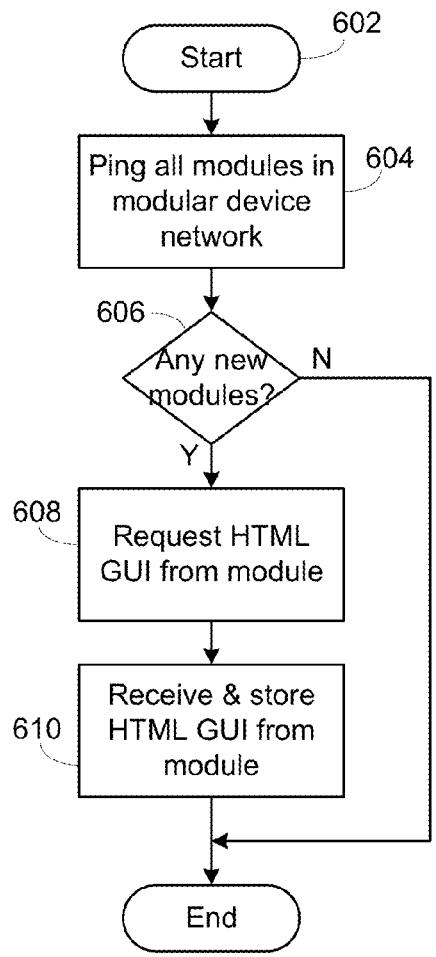
FIGS. 6A and 6B are flowcharts of operation of the controller of FIG. 3 relating to the GUI.
Figure 6B:
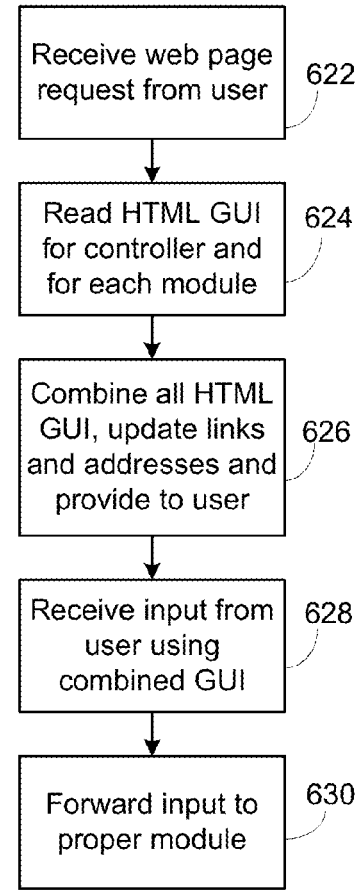

FIGS. 6A and 6B are flowcharts of relevant software operations of the controller 102. As above these are just the relevant software operations for this description and it is understood that numerous other software operations will be occurring on the controller 102, both underlying operating system operations and controller 102 function operations. In step 602 the HTML GUI collection begins, generally at startup of the controller 102. In step 604 all of the hardware modules in the distributed system are pinged to determine their presence. In step 606 it is determined if any new hardware modules have been found. If none were found, this operation ends. If a new hardware module was found, in step 608 the controller 102 requests the HTML for the GUI from the hardware module. In step 610 the HTML for the GUI is received and then stored in an HTML storage area in the memory 304. This HTML storage area contains the HTML for the controller 102 and all of the hardware modules. The operation then ends.

In step 622 the controller 102 receives a web page request from the user's client browser 110. In step 624 the controller 102 reads all of the HTML of the GUIs for the controller 102 and for each hardware module presently active from the HTML storage area. The controller 102 HTML for the GUI includes the basic body of the page and any elements handled by the controller 102. The hardware modules can be added as tabs or in other manners as desired by the developer. In step 626 all of the HTML for the GUIs is combined to form a single web page, which is provided to the user. One portion of this combination can include completing variables or wild cards provided in the HTML of an individual hardware module. As a first example, if a hardware module can have various aspects configured by a user, the HTML will contain portions of a REST protocol exchange. However, as the hardware module cannot know the address or URL of the controller 102, the hardware module provides a variable or wild card that the controller 102 replaces with the proper URL in the REST string. As a second example, there may be two identical hardware modules in the particular distributed system. The HTML of each hardware module will contain a variable or wildcard that the controller 102 replaces with a unique value for each hardware module, to allow any REST responses to be identified as to the particular hardware module. Therefore the combination can be more than a simple combination of the provided HTML and can include modification to allow proper operation and identification of items such as REST responses.

In step 628 the controller 102 receives a response from the provided web page, such as a configuration change for the hardware module 104, based on the display of the HTML of the hardware module 104 having provisions to accept inputs. In step 630 the received input is provided to the proper hardware module. This is readily done as the response or request to change a setting in the hardware module 104 is preferably a REST-based response, which then includes the URI (uniform resource identifier) of the hardware module 104 in the response so that URI can be used to forward the response to the hardware module.

As can be seen, the controller 102 is just a proxy of the GUI elements and does not need to interpret GUI elements or events beyond the above-mentioned substitution of variables or wild cards. There is no need to develop and maintain new, fast-changing APIs.

Figure 7:
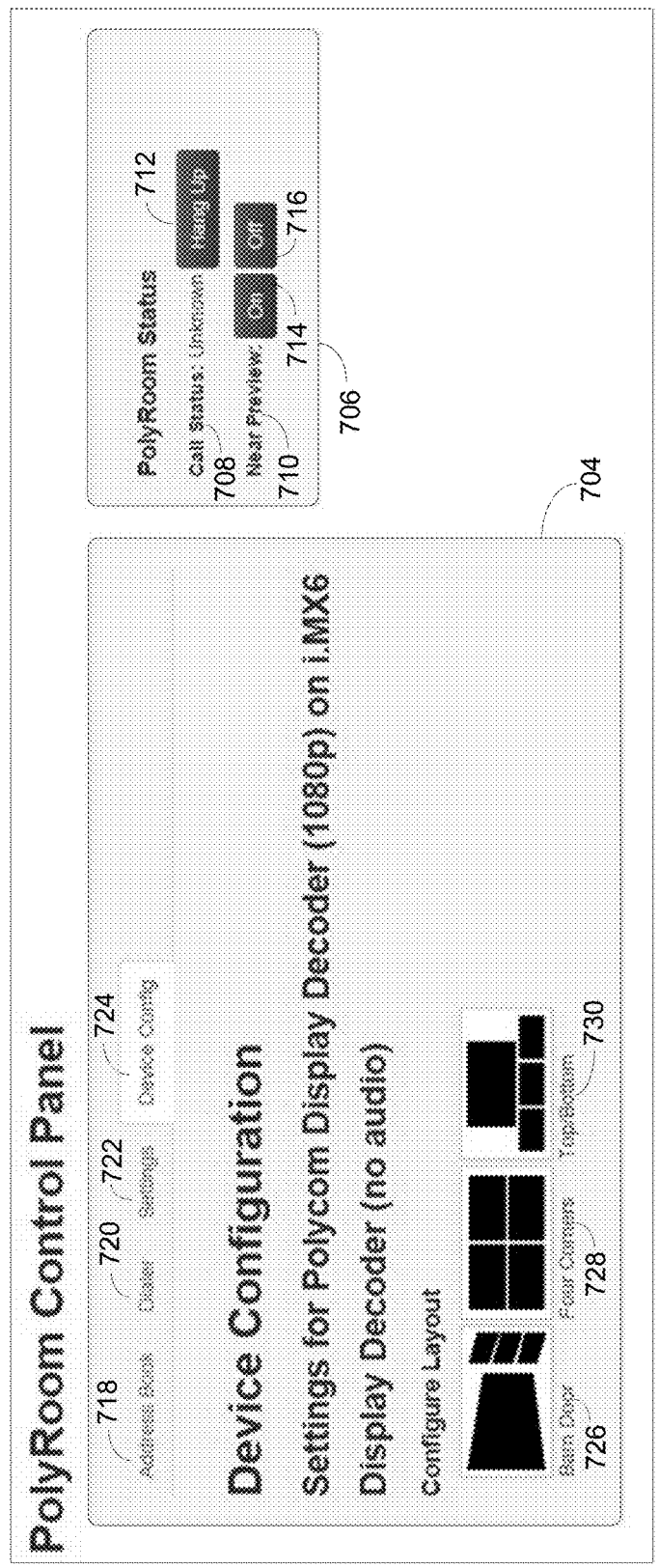
FIG. 7 is an exemplary screenshot of a GUI according to the present invention.

FIG. 7 shows a simple screen shot according to the present invention. In the screenshot 702 the hardware module is a display decoder. The screenshot 702 includes two different windows, a control and settings window 704 and as status window 706. The status window 706 is simple, providing just call status 708 and whether the near end of the videoconference is to be provided as a preview 710. The call status 708 portion includes a Hang Up button 712 to allow the conference to be terminated. Clicking on the Hang Up button 712 sends a REST response to the controller 102, as this functionality is provided by the controller 102. The Near Preview portion has two buttons, On 714 and Off 716. Clicking one of the buttons sends the related REST response to the controller 102, which responds accordingly.

The control and settings window 704 includes four tabs: Address Book 718, Dialer 720, Settings 722 and Device Config 724. The Address Book 718, Dialer 720, and Settings 722 tabs are part of the basic body of the web page as those are controller 102 functions or commands. The Device Config tab 724 is the tab provided by the HTML of the GUI of the hardware module 104. In the illustrated tab 724 three different video layout are shown, Barn Door 726, Four Corners 728 and Top/Bottom 730. Each of the layouts is a button that can be clicked, which results in a REST response indicating the selection of that layout being provided to the hardware module 104, using the controller 102 as a REST proxy as the controller 102 just passes the REST response.

FIG. 7 is just a simple example of a system GUI of a distributed system according to the present invention. It is understood that quite complex system GUIs could be developed if needed.

As can be seen, in the illustrated embodiment the HTML GUI for the hardware module 104 is provided as a separate tab. If additional hardware modules were present, there would be additional tabs, one for each hardware module that had data to display or settings to change. The tab nature makes the addition of the additional hardware modules easily fit into the overall GUI of the distributed system. It is understood that alternate GUI layouts of the hardware module HTML and GUI can be developed, the tab format simply being an embodiment.

Thus it is seen that the controller can connect to arbitrary hardware modules. There is no need to update the controller itself to support new GUI elements, as the software required for this is carried by the hardware module and is thus available when the two are connected. If a new or updated module is released after the controller has been finalized, they can be connected and will interoperate without any further updates.

This aids in development and testing as well. The distributed hardware can be developed and tested in isolation. By providing a low-level debug implementation of the controller's aggregation code, the GUI elements can be unit tested without the need for the controller's hardware and software to be finalized.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A distributed system providing a system graphical user interface (GUI) to a user, the distributed system comprising:
    a controller for communicating with the user and including base HTML to develop a base portion of the GUI; and
    at least one hardware module for communicating with the controller and including hardware module specific HTML to develop a hardware module specific portion of a GUI,
    wherein the at least one hardware module provides the hardware module specific HTML to the controller,
    wherein the controller combines the base HTML and the received hardware module specific HTML to form system HTML which forms the system GUI for providing to the user, and
    wherein the controller receives data from the system GUI from the user and forwards the data to the hardware module.

2. The distributed system of claim 1, wherein the controller includes:
    a processor for executing software;
    memory connected to the processor for storing data, HTML and software executed by the processor;
    a network interface coupled to the processor for connecting to a network used by the user;
    a hardware module network interface coupled to the processor for connecting to a network used by the at least one hardware module; and
    software contained in the memory and executed by the processor which causes the processor to:
        provide a web server accessible through the network interface and accessible to the user to provide the system HTML for use by the user and to receive input from the user operating the system GUI;
        obtain module specific HTML from each at least one hardware module;

combine base HTML of the controller and the module specific HTML from each at least one hardware module to form system HTML which provides the system GUI;

provide the system HTML to the web server when the system web page is requested by a user; and forward inputs received by the web server to the appropriate of the controller or the at least one hardware module.

3. The distributed system of claim 1, wherein the at least one hardware module includes:

a processor for executing software;

memory connected to the processor for storing data, HTML and software executed by the processor;

an at least one hardware module function module for performing the function of the at least one hardware module;

a hardware module network interface coupled to the processor for connecting to a network used by the controller; and software contained in the memory and executed by the processor which causes the processor to:

provide hardware module specific HTML to the controller when requested;

receive inputs from the controller, the inputs provided from the system GUI for setting items in the at least one hardware module; and applying the received inputs to the at least one hardware module function module.

4. The distributed system of claim 1, wherein the HTML is HTML5.

5. The distributed system of claim 1, wherein the HTML is a combination of HTML5 and Javascript.

6. The distributed system of claim 1, wherein combining base HTML of the controller and the module specific HTML from each at least one hardware module to form system HTML which provides the system GUI includes replacing variables provided in the module specific HTML with system specific values.

7. A method of operating a distributed system providing a system graphical user interface (GUI) to a user, the distributed system including a controller for communicating with the user and including base HTML to develop a base portion of the GUI and at least one hardware module for communicating with the controller and including hardware module specific HTML to develop a hardware module specific portion of a GUI, the method comprising the steps of:

the at least one hardware module providing the hardware module specific HTML to the controller, the controller combining the base HTML and the received hardware module specific HTML to form a system HTML which forms the system GUI;

the controller providing the complete system GUI to the user; and the controller receiving data from the system GUI from the user and forwarding the data to the hardware module.

8. The method of claim 7, the method further comprising the steps of:

the controller providing a web server accessible through a network interface and accessible to the user to provide a system GUI for use by the user and to receive input from the user operating the system GUI; and the controller providing the system HTML to the web server when the system web page is requested by a user.

9. The method of claim 7, the method further comprising the steps of:

the hardware module performing the function of the at least one hardware module;

the hardware module receiving inputs from the controller; and the hardware module applying the received inputs to configure the at least one hardware module.

10. The method of claim 7, wherein the HTML is HTML5.

11. The method of claim 7, wherein the HTML is a combination of HTML5 and Javascript.

12. The method of claim 7, wherein combining the base HTML and the received module specific HTML to form a system HTML which provides the system GUI includes replacing variables provided in the received module specific HTML with system specific values.

13. Non-transitory computer readable storage media having computer-executable instructions stored therein for causing processors operating a distributed system providing a system graphical user interface (GUI) to a user, the distributed system including a controller with a processor for communicating with the user and including base HTML to develop a base portion of the GUI and at least one hardware module with a processor for communicating with the controller and including hardware module specific HTML to develop a hardware module specific portion of a GUI to perform the following method, the method comprising the steps of:

the at least one hardware module processor providing the hardware module specific HTML to the controller, the controller processor combining the base HTML and the received hardware module specific HTML to form a system HTML which forms the system GUI;

the controller processor providing the complete system GUI to the user; and the controller processor receiving data from the system GUI from the user and forwarding the data to the hardware module.

14. The non-transitory computer readable storage media of claim 13, the method further comprising the steps of:

the controller processor providing a web server accessible through a network interface and accessible to the user to provide a system GUI for use by the user and to receive input from the user operating the system GUI; and the controller processor providing the system HTML to the web server when the system web page is requested by a user.

15. The on-transitory computer readable storage media of claim 13, the method further comprising the steps of:

the hardware module processor receiving inputs from the controller; and the hardware module processor applying the received inputs to configure the at least one hardware module.

16. The non-transitory computer readable storage media of claim 13, wherein the HTML is HTML5.

17. The non-transitory computer readable storage media of claim 13, wherein the HTML is a combination of HTML5 and Javascript.

18. The non-transitory computer readable storage media of claim 13, wherein combining base HTML and the received module specific HTML to form a system HTML which provides the system GUI includes replacing variables provided in the received module specific HTML with system specific values.

* * * * *